(12) United States Patent
Kim et al.

(10) Patent No.: US 9,897,322 B2
(45) Date of Patent: Feb. 20, 2018

(54) COMBUSTOR ASSEMBLY FOR A GAS TURBINE ENGINE AND METHOD OF MAKING SAME

(71) Applicant: General Electric Company, Schenectady, NY (US)

(72) Inventors: Kihyung Kim, Atlanta, GA (US); Diego Fernando Rancruel, Greenville, SC (US); Prashant C. Mahalingappanavar, Karnataka (IN)

(73) Assignee: General Electric Company, Schenectady, NY (US)

(*) Notice: Subject to any disclaimer, the term of this patent is extended or adjusted under 35 U.S.C. 154(b) by 246 days.

(21) Appl. No.: 14/793,000

(22) Filed: Jul. 7, 2015

(65) Prior Publication Data
US 2017/0009996 A1  Jan. 12, 2017

(51) Int. Cl.
*F23R 3/46* (2006.01)
*F02C 7/228* (2006.01)
(Continued)

(52) U.S. Cl.
CPC ............. *F23R 3/46* (2013.01); *F02C 7/222* (2013.01); *F02C 7/228* (2013.01); *F02C 9/26* (2013.01);
(Continued)

(58) Field of Classification Search
CPC .... F23R 3/46; F23R 2900/00013; F02C 7/22; F02C 7/222; F02C 7/228; F23D 2210/00; F05B 2260/996
See application file for complete search history.

(56) References Cited

U.S. PATENT DOCUMENTS

2007/0039329 A1* 2/2007 Abreu ............... F02C 7/22
  60/776
2009/0077972 A1* 3/2009 Singh ............... F02C 7/222
  60/737
(Continued)

FOREIGN PATENT DOCUMENTS

EP  1 278 014 A2  1/2003
WO  2013/192523 A1  12/2013

OTHER PUBLICATIONS

U.S. Appl. No. 14/268,696, filed May 2, 2014, entitled "Fuel Supply System."
(Continued)

*Primary Examiner* — Pascal M Bui Pho
*Assistant Examiner* — Katheryn Malatek
(74) *Attorney, Agent, or Firm* — Armstrong Teasdale LLP

(57) ABSTRACT

A combustor can assembly includes a plurality of combustor cans spaced circumferentially about a gas turbine engine. Each combustor can is coupled in flow communication with at least one fuel manifold via a respective can fuel line. The combustor can assembly also includes a first interconnecting fuel line that includes a first end and a second end. The first end is coupled in flow communication with the can fuel line of a first combustor can, and the second end is coupled in flow communication with the can fuel line of a second combustor can that is not circumferentially adjacent to the first combustor can. The combustor can assembly further includes a first control device operatively coupled to the can fuel line of the first combustor can. The first control device is operable to change a dynamic operational characteristic of the first and second combustor cans independently of other combustor cans.

20 Claims, 5 Drawing Sheets

(51) Int. Cl.
    *F23N 1/00*         (2006.01)
    *F23N 5/24*         (2006.01)
    *F23R 3/34*         (2006.01)
    *F02C 9/26*         (2006.01)
    *F02C 9/28*         (2006.01)
    *F02C 7/22*         (2006.01)

(52) U.S. Cl.
    CPC ............... *F02C 9/28* (2013.01); *F23N 1/005* (2013.01); *F23N 5/24* (2013.01); *F23R 3/34* (2013.01); *F02C 7/22* (2013.01); *F05D 2260/964* (2013.01); *F05D 2270/14* (2013.01); *F05D 2270/301* (2013.01); *F05D 2270/333* (2013.01); *F23D 2210/00* (2013.01); *F23N 2037/02* (2013.01); *F23R 2900/00013* (2013.01)

(56) References Cited

U.S. PATENT DOCUMENTS

| | | | |
|---|---|---|---|
| 2010/0043387 A1* | 2/2010 | Myers | F02C 7/228 60/39.281 |
| 2014/0137535 A1 | 5/2014 | Kim et al. | |
| 2014/0238041 A1 | 8/2014 | Crothers et al. | |

OTHER PUBLICATIONS

Extended European Search Report and Opinion issued in connection with corresponding EP Application No. 16177832.9 dated Nov. 15, 2016.

\* cited by examiner

COMBUSTOR ASSEMBLY FOR A GAS TURBINE ENGINE AND METHOD OF MAKING SAME

BACKGROUND

The field of the disclosure relates generally to gas turbine engines, and more particularly to a combustor can assembly for use with a gas turbine engine.

At least some known combustors for gas turbine engines include multiple cans oriented in an array such that the cans interact acoustically with each other. Combustion dynamics, such as large pressure oscillations, may occur when heat release fluctuations couple with combustor can acoustic tones. Some of these combustor can acoustic tones may be in-phase with the tones of an adjacent can. In-phase tones of adjacent cans may excite components in a hot gas path of the gas turbine engine, such as turbine blades, if the tones coincide with the natural frequency of the components. Moreover, in-phase tones may be particularly of concern when the instabilities in adjacent combustor cans are coherent, that is, when there is a strong relationship between adjacent cans in the frequency of the instability. Such coherent in-phase tones potentially negatively impact a thermodynamic efficiency and a flame stability of the combustor, and an operational life of the combustor and hot gas path components.

At least some known combustor arrays include combustor cans designed, or "tuned," with differing volumes and lengths in an attempt to limit an amplitude of the in-phase coherent tones near natural frequencies of the gas turbine components. However, at least some such tuning techniques may result in a limited overall operability space for the combustor, and as such, the benefits of such tuning may be limited. Moreover, a significant amount of time and resources may be required to achieve frequency avoidance between the combustor and the turbine components. Further, an accuracy of the resulting frequency avoidance is limited by a predictive capability of the design process.

BRIEF DESCRIPTION

In one aspect, a combustor can assembly for a gas turbine engine is provided. The combustor can assembly includes a plurality of combustor cans spaced circumferentially about the gas turbine engine. Each of the combustor cans is coupled in flow communication with at least one fuel manifold via a respective can fuel line. The combustor can assembly also includes a first interconnecting fuel line that includes a first end and a second end. The first end is coupled in flow communication with the can fuel line of a first of the combustor cans, and the second end is coupled in flow communication with the can fuel line of a second of the combustor cans. The second combustor can is not circumferentially adjacent to the first combustor can. The combustor can assembly further includes a first control device operatively coupled to the can fuel line of the first combustor can upstream of the first interconnecting fuel line first end. The first control device is operable to change a dynamic operational characteristic of the first and second combustor cans independently of others of the plurality of combustor cans.

In another aspect, a gas turbine engine is provided. The gas turbine engine includes a compressor and a combustor can assembly coupled in flow communication with the compressor. The combustor can assembly includes a plurality of combustor cans spaced circumferentially about the gas turbine engine. Each of the combustor cans is coupled in flow communication with at least one fuel manifold via a respective can fuel line. The combustor can assembly also includes a first interconnecting fuel line that includes a first end and a second end. The first end is coupled in flow communication with the can fuel line of a first of the combustor cans, and the second end is coupled in flow communication with the can fuel line of a second of the combustor cans. The second combustor can is not circumferentially adjacent to the first combustor can. The combustor can assembly further includes a first control device operatively coupled to the can fuel line of the first combustor can upstream of the first interconnecting fuel line first end. The first control device is operable to change a dynamic operational characteristic of the first and second combustor cans independently of others of the plurality of combustor cans.

In another aspect, a method of assembling a combustor can assembly for a gas turbine engine is provided. The method includes spacing a plurality of combustor cans circumferentially about the gas turbine engine such that each of the combustor cans is coupled in flow communication with at least one fuel manifold via a respective can fuel line. The method also includes coupling a first end of a first interconnecting fuel line in flow communication with the can fuel line of a first of the combustor cans, and coupling a second end of the first interconnecting fuel line in flow communication with the can fuel line of a second of the combustor cans. The second combustor can is not circumferentially adjacent to the first combustor can. The method further includes coupling a first control device operatively to the can fuel line of the first combustor can upstream of the first interconnecting fuel line first end. The first control device is operable to change a dynamic operational characteristic of the first and second combustor cans independently of others of the plurality of combustor cans.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The exemplary components and methods described herein overcome at least some of the disadvantages associated with known combustor can assemblies for gas turbine engines. The embodiments described herein include an interconnecting fuel line coupled between fuel lines of combustor cans that are not circumferentially adjacent, and a control device, such as but not limited to a valve, coupled to one of the can fuel lines. The control device is operable to change a dynamic operational characteristic of the associated combustor cans independently of an adjacent combustor can. For example, the control device is operable to impart an oscillatory component having a predetermined frequency to a flow of fuel through a fuel line of the non-adjacent combustor cans.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
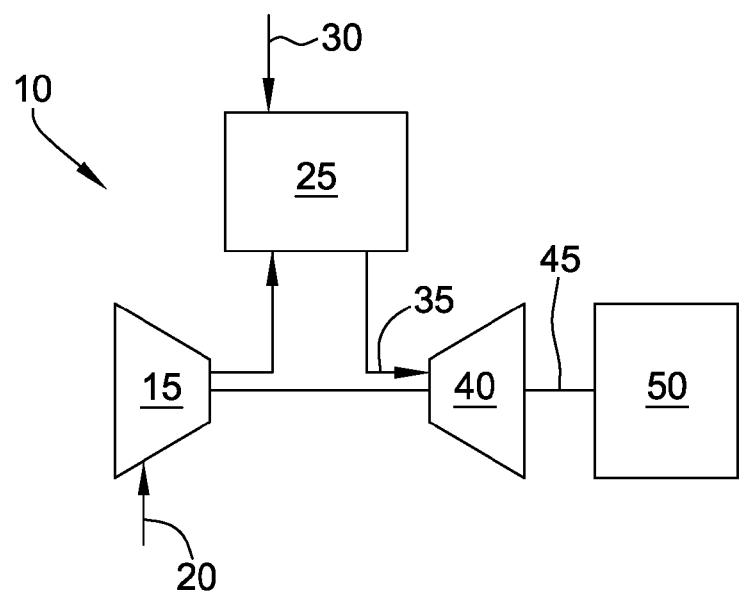
FIG. 1 is a schematic diagram of an exemplary gas turbine engine.

Referring now to the drawings, in which like numerals refer to the same elements throughout the several views, FIG. 1 is a schematic diagram of an exemplary gas turbine engine 10. Gas turbine engine 10 includes a compressor 15. Compressor 15 compresses an incoming flow of air 20 and delivers a compressed flow of air 20 to a number of combustor cans 25. Combustor cans 25 mix air 20 with a pressurized flow of fuel 30 and ignite the combined mixture to create a flow of hot combustion gases 35. Although only a single combustor can 25 is shown, gas turbine engine 10 may include any suitable number of combustor cans 25. The flow of the hot combustion gases 35 is in turn channeled to a turbine 40. The flow of hot combustion gases 35 drive turbine 40 so as to produce mechanical work. In the exemplary embodiment, mechanical work produced in turbine 40 drives compressor 15 via a shaft 45, as well as an external load 50, such as an electrical generator. Gas turbine engine 10 uses at least one of natural gas, various types of syngas, and/or another suitable fuel.

Figure 2:
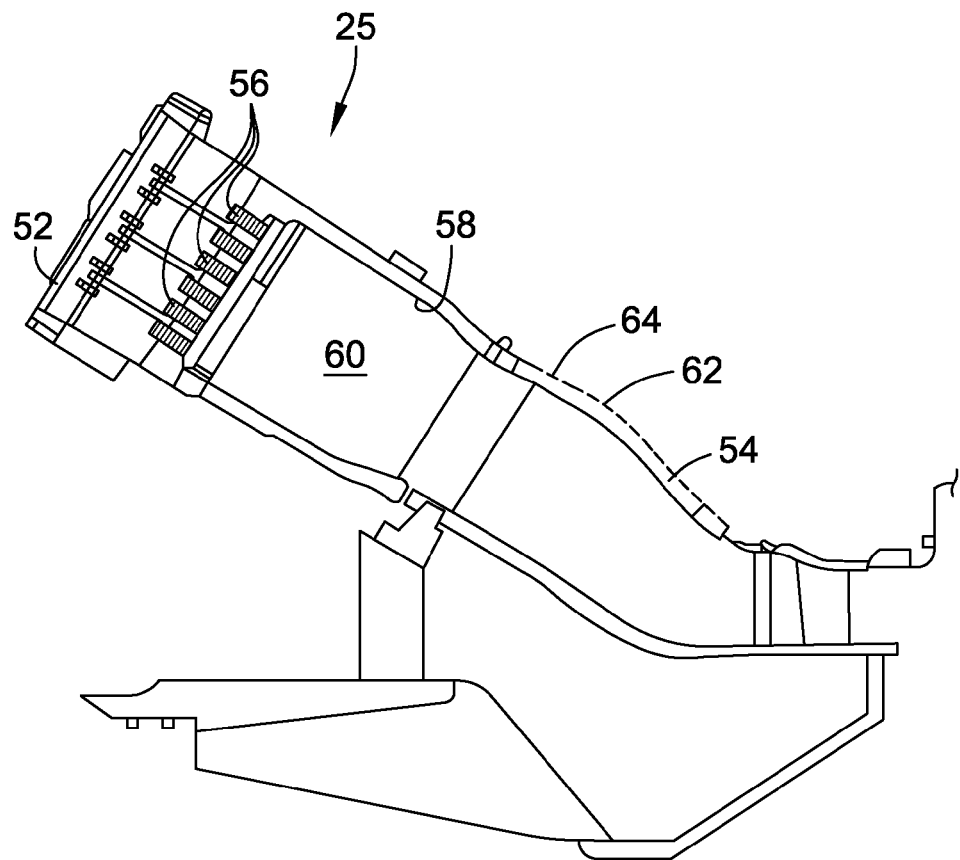
FIG. 2 is a schematic diagram of an exemplary combustor that may be used with the gas turbine engine shown in FIG. 1.

FIG. 2 is a schematic diagram of an exemplary combustor can 25. In the exemplary embodiment, combustor can 25 extends from an end cap 52 at a head end to a transition piece 54 at an aft end that is proximate turbine 40. A number of fuel injectors 56 are positioned proximate end cap 52. A liner 58 extends from fuel injectors 56 towards transition piece 54 and defines a combustion zone 60 therein. Liner 58 is surrounded by a flow sleeve 62. Liner 58 and flow sleeve 62 define a flow path 64 therebetween to channel air 20 from compressor 15 or another suitable source.

Figure 3:
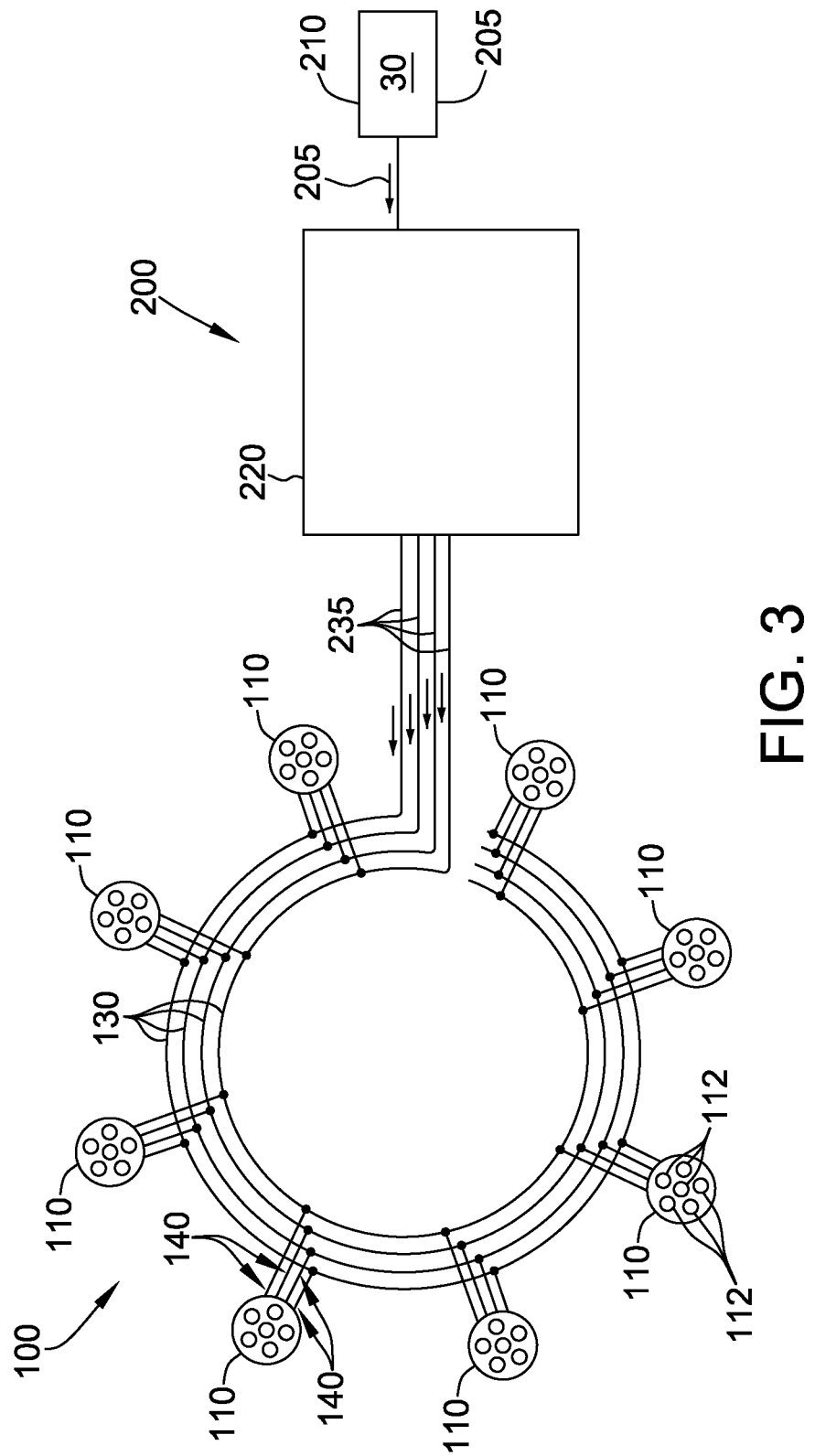
FIG. 3 is a schematic diagram of an exemplary combustor can assembly that may be used with the gas turbine engine shown in FIG. 1.

FIG. 3 is a schematic diagram of an exemplary combustor can assembly 100 that may be used with gas turbine engine 10 (shown in FIG. 1). Combustor can assembly 100 includes a plurality of combustor cans 110, such as combustor can 25 (shown in FIG. 2) or another suitable combustor can, spaced circumferentially about gas turbine engine 10. In the illustrated embodiment, combustor can assembly 100 includes eight combustor cans 110. In alternative embodiments, combustor can assembly 100 includes any suitable number of combustor cans 110 that enables combustor can assembly 100 to function as described herein.

Each combustor can 110 is coupled in flow communication with at least one fuel manifold 130 via a respective fuel line 140. In the illustrated embodiment, the at least one fuel manifold 130 includes four fuel manifolds 130, each coupled in flow communication with each combustor can 110 by a respective fuel line 140. In alternative embodiments, the at least one fuel manifold 130 includes any suitable number of fuel manifolds 130 that enables combustor can assembly 100 to function as described herein.

More specifically, each combustor can 110 includes at least one fuel injector 112, such as fuel injector 56, that is coupled in flow communication with the at least one fuel manifold 130 via the respective fuel line 140. In the illustrated embodiment, each combustor can 110 includes six fuel injectors 112 coupled to the four fuel manifolds 130. For example, in some embodiments, for each combustor can 110, a first and second of the six fuel injectors 112 are coupled to a first of the four fuel manifolds 130 via a first fuel line 140, a third and fourth of the six fuel injectors 112 are coupled to a second of the four fuel manifolds 130 via a second fuel line 140, a fifth of the six fuel injectors 112 is coupled to a third of the four fuel manifolds 130 via a third fuel line 140, and a sixth of the six fuel injectors 112 is coupled to a fourth of the four fuel manifolds 130 via a fourth fuel line 140. In alternative embodiments, each combustor can 110 includes any suitable number of fuel injectors 112 coupled in any suitable arrangement to the at least one fuel manifold 130 that enables combustor can assembly 100 to function as described herein.

Combustor can assembly 100 is in flow communication with a fuel delivery system 200. Fuel delivery system 200 includes a fuel supply 210 configured to deliver a source flow 205 of fuel 30 to combustor can assembly 100. Fuel supply 210 is in flow communication with a suitable fuel distribution system 220 that distributes source flow 205 into at least one manifold flow 235 of fuel 30. Each at least one manifold flow 235 is distributed to a corresponding one of the at least one fuel manifold 130. In some embodiments, fuel distribution system 220 also includes suitable fuel conditioning components (not shown). In alternative embodiments, fuel distribution system 220 does not include fuel conditioning components.

Figure 4:
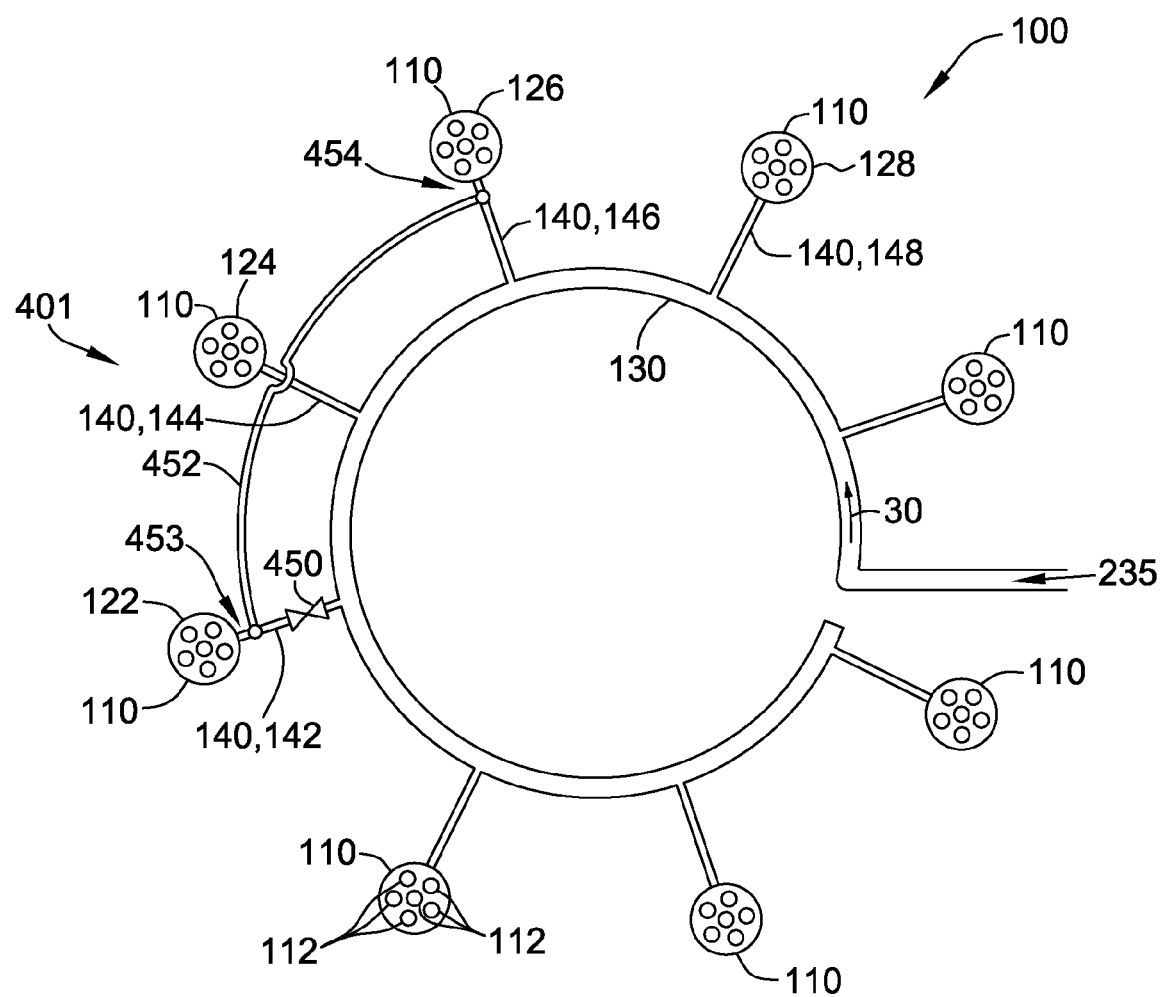
FIG. 4 is a schematic diagram of an exemplary fuel modulation system that may be used with the combustor can assembly shown in FIG. 3.

FIG. 4 is a schematic diagram of an exemplary embodiment of a fuel modulation system 401 that may be used with combustor can assembly 100. In the illustrated embodiment, the circumferentially spaced plurality of combustor cans 110 includes a first combustor can 122, a second combustor can 124 adjacent to first combustor can 122, a third combustor can 126 adjacent to second combustor can 124, and a fourth combustor can 128 adjacent to third combustor can 126. At least one fuel injector 112 of each of first combustor can 122, second combustor can 124, third combustor can 126, and fourth combustor can 128 is coupled in flow communication with fuel manifold 130 via corresponding can fuel lines 140, designated respectively as a first can fuel line 142, a second can fuel line 144, a third can fuel line 146, and a fourth can fuel line 148. Although only one fuel manifold 130 is shown, it should be understood that in some embodiments, each combustor can 110 includes additional fuel injectors 112 coupled in flow communication with additional fuel manifolds 130 (shown in FIG. 3) via additional fuel lines 140 (shown in FIG. 3).

Fuel modulation system 401 includes an interconnecting fuel line 452 coupled in flow communication between the can fuel line 140 of a first combustor can 110 and the can fuel line 140 of a second combustor can 110 that is not circumferentially adjacent to the first combustor can 110. For example, in the illustrated embodiment, a first end 453 of interconnecting fuel line 452 is coupled to first can fuel line 142 of first combustor can 122, and a second end 454 of interconnecting fuel line 452 is coupled to third can fuel line 146 of third combustor can 126. First combustor can 122 and third combustor can 126 are separated by second combustor can 124 and, thus, are not circumferentially adjacent to each other. In alternative embodiments, interconnecting fuel line 452 is coupled in flow communication between can fuel lines 140 of any two combustor cans 110 that are not circumferentially adjacent.

Fuel modulation system 401 further includes a control device 450 operatively coupled to fuel line 140 of the first combustor can 110. Control device 450 is operable to at least partially control a flow of fuel 30 through fuel line 140 of the first combustor can 110. In addition, control device 450 is positioned on fuel line 140 upstream of interconnecting fuel line 452, such that control device 450 also at least partially controls a flow of fuel 30 through interconnecting fuel line 452 and fuel line 140 of the second combustor can 110. For example, in the illustrated embodiment, control device 450 is coupled to first can fuel line 142 of first combustor can 122, upstream of first end 453 of interconnecting fuel line 452. Accordingly, control device 450 is operable to at least partially control a flow of fuel 30 through first can fuel line 142, interconnecting fuel line 452, and third can fuel line 146. In alternative embodiments, control device 450 is operatively coupled to any fuel line 140 to which interconnecting fuel line 452 also is coupled.

Control device 450 is operable to change a dynamic operational characteristic of the first and second combustor cans 110 independently of others of the plurality of combustor cans 110. For example, in some embodiments, control device 450 is operable to impart an oscillatory component having a predetermined frequency to the flow of fuel 30 through the can fuel line 140 of each of the first and second combustor cans 110. As an example, control device 450 is a valve moved between a nominally open position and a partially closed position with the predetermined frequency, imparting an oscillatory component at the same predetermined frequency to the flow of fuel 30 through first can fuel line 142 to first combustor can 122. Additionally, as control device 450 is operated with the predetermined frequency, an oscillatory component at the same predetermined frequency is imparted to the flow of fuel 30 through interconnecting fuel line 452 and, therefore, to the flow of fuel through third can fuel line 146 to third combustor can 126. The oscillatory components in the flow of fuel to first combustor can 122 and third combustor can 126 in turn at least partially determine the respective combustion dynamics of first combustor can 122 and third combustor can 126.

In certain embodiments, control device 450 is configured such that operation of control device 450 does not substantially affect a nominal flow rate of fuel 30 to combustor cans 110. For example, in some embodiments, operation of control device 450 imparts an oscillatory component to the flow rate of fuel 30 to the first combustor can 110 that is less than about two percent of the average flow rate of fuel to the first combustor can 110. For another example, in some embodiments, operation of control device 450 imparts an oscillatory component to the flow rate of fuel 30 to the first combustor can 110 that is less than about half a percent of the average flow rate of fuel to the first combustor can 110. In alternative embodiments, operation of control device 450 imparts an oscillatory component to the flow rate of fuel 30 to the first combustor can 110 having any suitable magnitude relative to the average flow rate of fuel 30 to the first combustor can 110 that enables fuel modulation system 401 to function as described herein.

In certain embodiments, as described above, control device 450 is implemented using any suitable valve that is configurable to operate between a closed position and a partially open position, as described above. In other embodiments, control device 450 is implemented using a suitably activatable mechanical noise generator, such as but not limited to one of a rotating device and a flapper device, that is operable to disturb a flow of fuel 30 through fuel line 140. In alternative embodiments, control device 450 is implemented using any suitable device that enables fuel modulation system 401 to function as described herein.

Because interconnecting fuel line 452 is not coupled in flow communication with others of the plurality of combustor cans 110 that are adjacent to the first and second of the plurality of combustor cans 110, no corresponding oscillatory component is imparted to a flow of fuel 30 to the adjacent cans 110. For example, in the illustrated embodiment, interconnecting fuel line 452 is not coupled in flow communication with second can fuel line 144 of second combustor can 124 and fourth can fuel line 148 of fourth combustor can 128, and therefore no corresponding oscillatory component is imparted to a flow of fuel 30 to second combustor can 124 and fourth combustor can 128. Thus, the oscillatory component of fuel flow to first combustor can 122 and third combustor can 126 changes the combustion dynamics of first combustor can 122 and third combustor can 126 independently of second combustor can 124 and fourth combustor can 128. In some embodiments, the predetermined frequency of operation of control device 450 is selected to reduce at least one of a coherence of the acoustic tones of first combustor can 122 and adjacent second combustor can 124, and a coherence of the acoustic tones of third combustor can 126 and adjacent fourth combustor can 128. Moreover, in certain embodiments, the predetermined frequency is actively selected and/or modified during operation of combustor can assembly 100 based on observed combustion dynamics of combustor cans 110. Thus, fuel modulation system 401 enables active reduction of a wide range of combustion dynamics in adjacent combustor cans 110.

Figure 5:
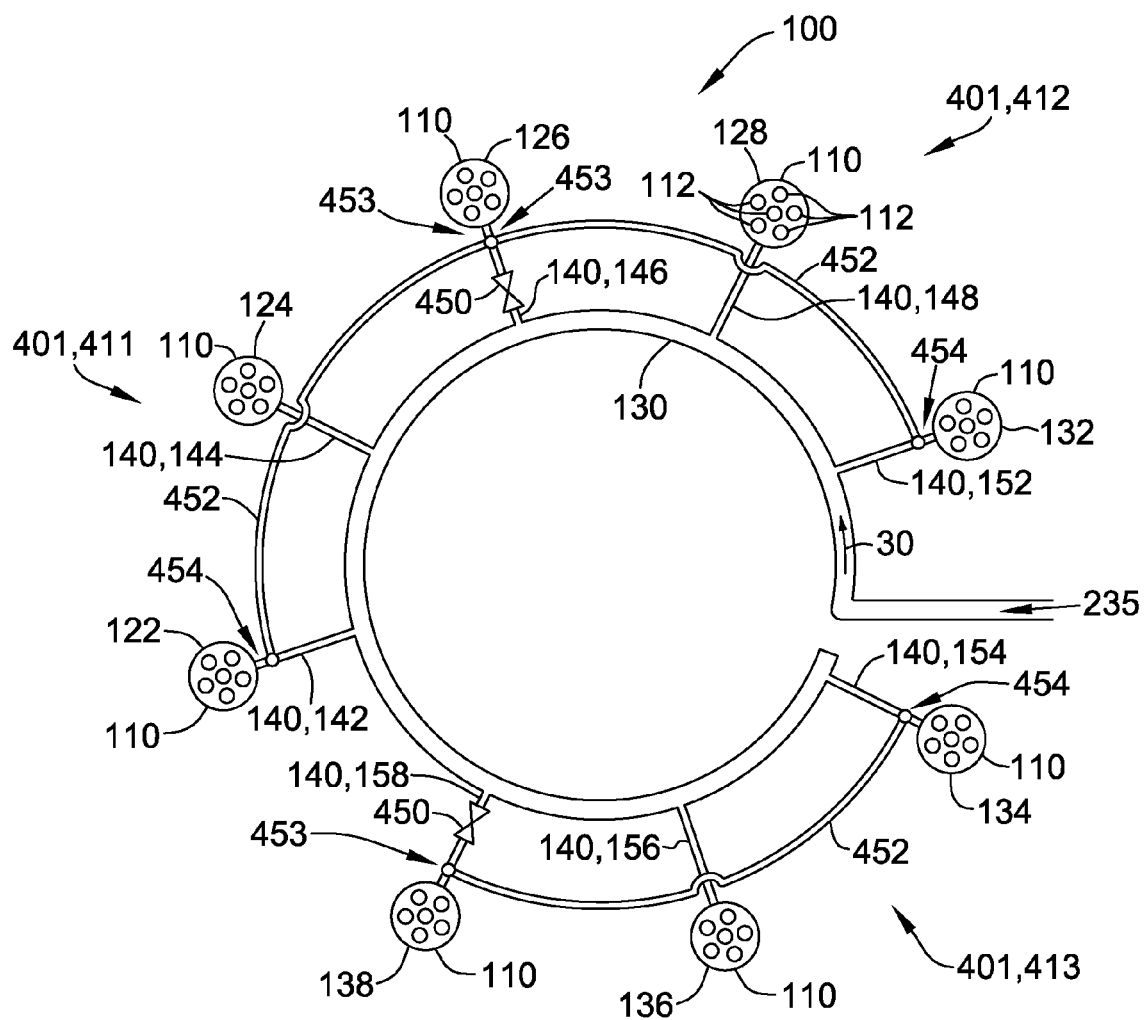
FIG. 5 is a schematic diagram of an exemplary configuration of a plurality of the fuel modulation systems shown in FIG. 4 coupled to the exemplary combustor can assembly shown in FIG. 3.

FIG. 5 is a schematic diagram of an exemplary configuration of a plurality of fuel modulation systems 401 coupled to combustor can assembly 100. In the illustrated embodiment, in addition to first combustor can 122, second combustor can 124, third combustor can 126, and fourth combustor can 128, the circumferentially spaced plurality of combustor cans 110 includes a fifth combustor can 132 adjacent to fourth combustor can 128, a sixth combustor can 134 adjacent to fifth combustor can 132, a seventh combustor can 136 adjacent to sixth combustor can 134, and an eighth combustor can 138 adjacent to seventh combustor can 136 and adjacent, on an opposite side, to first combustor can 122. As with each of first combustor can 122, second combustor can 124, third combustor can 126, and fourth combustor can 128, at least one fuel injector 112 of each of fifth combustor can 132, sixth combustor can 134, seventh combustor can 136, and eighth combustor can 138 is coupled in flow communication with fuel manifold 130 via corresponding can fuel lines 140, designated respectively as a fifth can fuel line 152, a sixth can fuel line 154, a seventh can fuel line 156, and an eighth can fuel line 158. Although only one fuel manifold 130 is shown, it should be understood that in some embodiments, each combustor can 110 includes additional fuel injectors 112 coupled in flow communication with additional fuel manifolds 130 (shown in FIG. 3) via additional can fuel lines 140 (shown in FIG. 3).

In the illustrated embodiment, plurality of fuel modulation systems 401 includes three fuel modulation systems 401 designated as first fuel modulation system 411, second fuel modulation system 412, and third fuel modulation system 413. In alternative embodiments, plurality of fuel modulation systems 401 includes any suitable number of fuel modulation systems 401 that enables combustor can assembly 100 to function as described herein. As described above, each of the plurality of fuel modulation systems 401 includes an interconnecting fuel line 452 coupled in flow communication between the can fuel line 140 of a first combustor can 110 and the can fuel line 140 of a second, non-adjacent combustor can 110.

In certain embodiments, each interconnecting fuel line 452 of two of the plurality of fuel modulation systems 401 is coupled to the same fuel line 140. For example, in the illustrated embodiment, a first end 453 of interconnecting fuel line 452 of first fuel modulation system 411 is coupled to third can fuel line 146 of third combustor can 126, and a second end 454 of interconnecting fuel line 452 of first fuel modulation system 411 is coupled to first can fuel line 142 of first combustor can 122. First combustor can 122 and third combustor can 126 are separated by second combustor can 124 and, thus, are not circumferentially adjacent to each other. In addition, a first end 453 of interconnecting fuel line 452 of second fuel modulation system 412 also is coupled to third can fuel line 146 of third combustor can 126, and a second end 454 of interconnecting fuel line 452 of second fuel modulation system 412 is coupled to fifth can fuel line 152 of fifth combustor can 132. Third combustor can 126 and fifth combustor can 132 are separated by fourth combustor can 128 and, thus, are not circumferentially adjacent to each other. In alternative embodiments, none of the plurality of fuel modulation systems 401 include interconnecting fuel lines 452 coupled to the same fuel line 140.

Also in the illustrated embodiment, a first end 453 of interconnecting fuel line 452 of third fuel modulation system 413 is coupled to eighth can fuel line 158 of eighth combustor can 138, and a second end 454 of interconnecting fuel line 452 of third fuel modulation system 413 is coupled to sixth can fuel line 154 of sixth combustor can 134. Sixth combustor can 134 and eighth combustor can 138 are separated by seventh combustor can 136 and, thus, are not circumferentially adjacent to each other. In alternative embodiments, interconnecting fuel line 452 of each of first fuel modulation system 411, second fuel modulation system 412, and third fuel modulation system 413 is coupled in flow communication between the can fuel lines 140 of any two non-adjacent combustor cans 110.

Also as described above, each of the plurality of fuel modulation systems 401 further includes a control device 450 operatively coupled to the can fuel line 140 of the corresponding first combustor can 110 upstream of interconnecting fuel line 452, and control device 450 is operable to at least partially control a flow of fuel 30 through the can fuel line 140 of the first combustor can 110, the corresponding interconnecting fuel line 452, and the corresponding can fuel line 140 of the second, non-adjacent combustor can 110 in the manner described above. Moreover, in some embodiments in which each interconnecting fuel line 452 of two of the plurality of fuel modulation systems 401 is coupled to the same can fuel line 140, a single control device 450 is operable to at least partially control the flow of fuel 30 in each of the interconnecting fuel lines 452 and corresponding can fuel line 140 of each second, non-adjacent combustor can 110. For example, in the illustrated embodiment, a single control device 450 is coupled to both first fuel modulation system 411 and second fuel modulation system 412. More specifically, the single control device 450 is coupled to third can fuel line 146 of third combustor can 126, upstream of first end 453 of both interconnecting fuel line 452 of first fuel modulation system 411, and interconnecting fuel line 452 of second fuel modulation system 412. Accordingly, the single control device 450 is operable to at least partially control a flow of fuel 30 through third can fuel line 146, interconnecting fuel line 452 of first fuel modulation system 411, first can fuel line 142, interconnecting fuel line 452 of second fuel modulation system 412, and fifth can fuel line 152. Thus, in certain embodiments, coupling interconnecting fuel line 452 of two of the plurality of fuel modulation systems 401 to the same can fuel line 140, and to the same control device 450, enables a reduction of a coherence of the acoustic tones of a large number of combustor cans 110 by controlling the single control device 450 in the manner described above, thus limiting an acquisition cost, a maintenance cost, and a control complexity of fuel modulation systems 401. In alternative embodiments, first fuel modulation system 411 and second fuel modulation system 412 are coupled to different control devices 450.

Also in the illustrated embodiment, third fuel modulation system 413 includes a separate control device 450 positioned on eighth can fuel line 158 upstream of the corresponding interconnecting fuel line 452, such that the separate control device 450 also at least partially controls a flow of fuel 30 through interconnecting fuel line 452 of third fuel modulation system 413 and sixth can fuel line 154 of sixth combustor can 134. Accordingly, control device 450 of third fuel modulation system 413 is operable to at least partially control a flow of fuel 30 through eighth can fuel line 158, the corresponding interconnecting fuel line 452, and sixth can fuel line 154 in the manner described above. It should be understood that, in alternative embodiments, for example embodiments in which combustor can assembly 100 includes more than eight combustor cans 110, an additional interconnecting fuel line 452 can be coupled in flow communication with eighth can fuel line 158, such that control device 450 of third fuel modulation system 413 also is associated with a fourth fuel modulation system (not shown). In some embodiments, the predetermined frequency of operation of control device 450 of third fuel modulation system 413 is selected to reduce at least one of a coherence of the acoustic tones of eighth combustor can 138 and adjacent seventh combustor can 136, a coherence of the acoustic tones of eighth combustor can 138 and adjacent first combustor can 122, a coherence of the acoustic tones of sixth combustor can 134 and adjacent seventh combustor can 136, and a coherence of the acoustic tones of sixth combustor can 134 and adjacent fifth combustor can 132. In certain embodiments, the predetermined frequency of operation of control device 450 of third fuel modulation system 413 is selected to differ from the predetermined frequency of operation of control device 450 of first fuel modulation system 411. Alternatively, the predetermined frequency of operation of control device 450 of third fuel modulation system 413 is selected to be substantially identical to the predetermined frequency of operation of control device 450 of first fuel modulation system 411. Moreover, in certain embodiments, the predetermined frequency of operation of control device 450 of third fuel modulation system 413 is actively selected and/or modified during operation of combustor can assembly 100 based on observed combustion dynamics of combustor cans 110. Thus, plurality of fuel modulation systems 401 enables active reduction of a wide range of combustion dynamics in adjacent combustor cans 110.

It should be understood that, although only a single fuel manifold 130 is shown as coupled to each of the fuel modulation systems 401 in the embodiments illustrated in FIG. 4 and FIG. 5, certain embodiments include fuel modulation systems 401 coupled to more than one of the plurality of fuel manifolds 130 (shown in FIG. 3) of combustor can assembly 100. For example, in some embodiments, first fuel modulation system 411 (shown in FIG. 5) is coupled to a first fuel manifold 130, and third fuel modulation system 413 is coupled to a second fuel manifold 130. Additionally or alternatively, fuel modulation system 401 is coupled to first combustor can 122 and third combustor can 126, as shown in FIG. 4, via the can fuel lines 140 in flow communication with a first of the plurality of fuel manifolds 130, and another fuel modulation system 401 is coupled to first combustor can 122 and third combustor can 126 via the can fuel lines 140 in flow communication with a second of the plurality of fuel manifolds 130.

Figure 6:
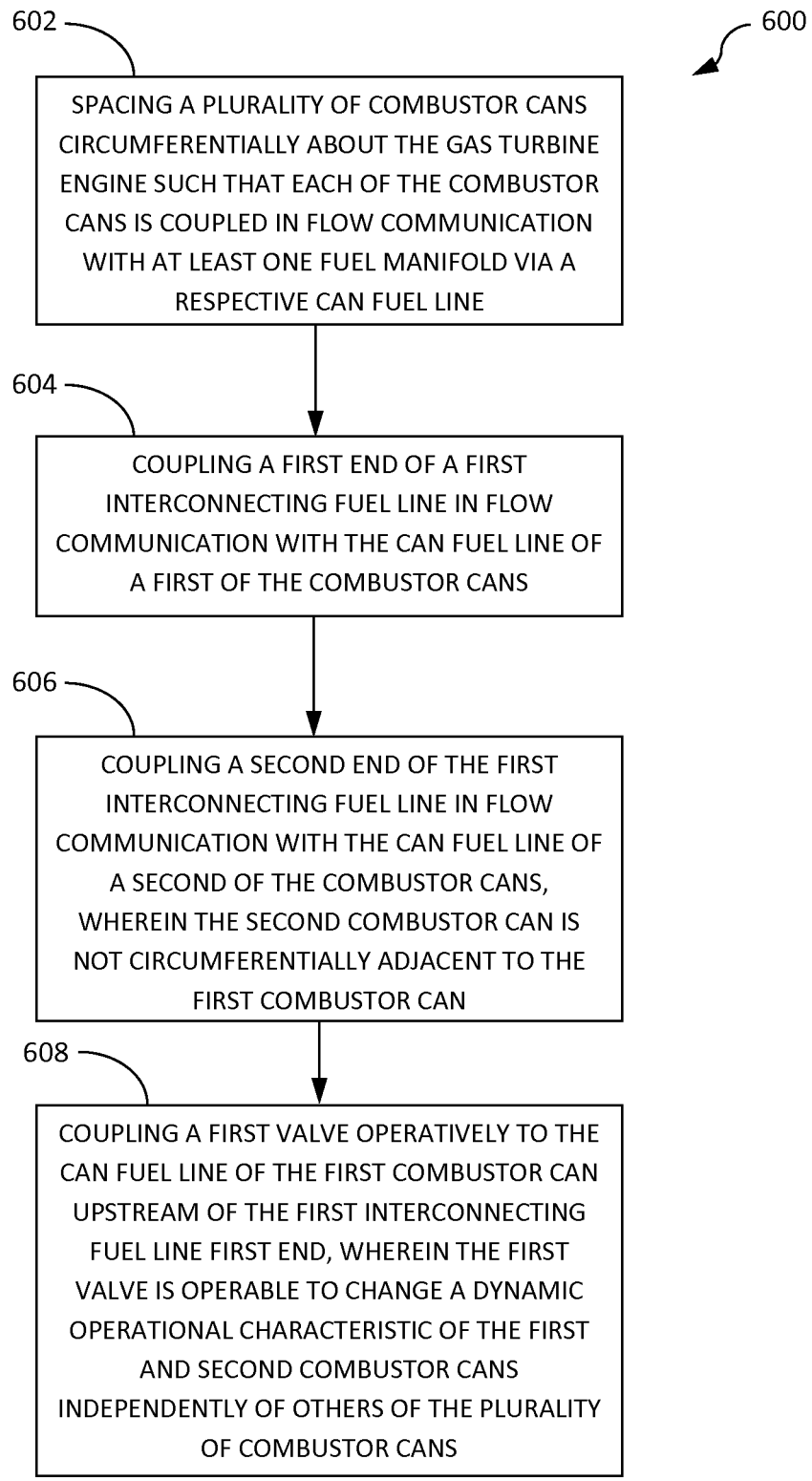
FIG. 6 is a flow diagram of an exemplary method of assembly of a combustor can assembly, such as the exemplary combustor can assemblies shown in FIGS. 4 and 5.

FIG. 6 is a schematic diagram of an exemplary method 600 of assembling a combustor can assembly, such as combustor can assembly 100, for a gas turbine engine, such as gas turbine engine 10. With reference to FIGS. 1-6, in some embodiments, method 600 includes spacing 602 a plurality of combustor cans, such as combustor cans 110, circumferentially about the gas turbine engine such that each of the combustor cans is coupled in flow communication with at least one fuel manifold, such as the at least one fuel manifold 130, via a respective can fuel line, such as can fuel lines 140. Method 600 also includes coupling 604 a first end of a first interconnecting fuel line, such as first end 453 of interconnecting fuel line 452, in flow communication with the can fuel line of a first of the combustor cans, and coupling 606 a second end, such as second end 454, of the first interconnecting fuel line in flow communication with the can fuel line of a second of the combustor cans. The second combustor can is not circumferentially adjacent to the first combustor can. Method 600 further includes coupling 608 a first control device, such as control device 450, operatively to the can fuel line of the first combustor can upstream of the first interconnecting fuel line first end. The first control device is operable to change a dynamic operational characteristic of the first and second combustor cans independently of others of the plurality of combustor cans.

Exemplary embodiments of a combustor can assembly, and a method for assembling the combustor can assembly, are described above in detail. The embodiments include an interconnecting fuel line and a control device operable to change a dynamic operational characteristic of a combustor can independently of an adjacent combustor can. In some embodiments, the control device is operable to impart an oscillatory component having a predetermined frequency to a flow of fuel through a can fuel line of certain combustor cans. The predetermined frequency can be actively selected and/or modified during operation of the combustor can assembly based on observed combustion dynamics of the various combustor cans. In some embodiments, the predetermined frequency of operation of the control device is selected to reduce a coherence of the acoustic tones of a first combustor can and an adjacent second combustor can. Moreover, certain embodiments enable a reduction of a coherence of the acoustic tones of a large number of combustor cans by controlling a single control device in the manner described above, thus limiting an acquisition cost, a maintenance cost, and a control complexity of the combustor can assembly.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" or "an embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A combustor can assembly for a gas turbine engine, said combustor can assembly comprising:
   a plurality of combustor cans spaced circumferentially about the gas turbine engine, wherein the plurality of combustor cans comprises at least a first combustor can and a second combustor can;
   a plurality of can fuel lines, each of said plurality of can fuel lines coupled between a respective one of said plurality of combustor cans and at least one fuel manifold so as to allow parallel flow from the at least one fuel manifold to the plurality of combustor cans and the plurality of can fuel lines comprises a first combustor can fuel line connecting the first combustor can to the at least one fuel manifold and a second combustor can fuel line connecting the second combustor can to the at least one fuel manifold;
   a first interconnecting fuel line coupled between the first combustor can fuel line and the second combustor can fuel line, such that said first interconnecting fuel line provides a fuel flow path between the first combustor can fuel line and the second combustor can fuel line in parallel to a fuel flow path of said at least one fuel manifold, wherein said second combustor can is not circumferentially adjacent to said first combustor can; and
   a first control device operatively coupled to said first combustor can fuel line upstream of said first interconnecting fuel line, said first control device operable to change a dynamic operational characteristic of said first and second combustor cans independently of at least another combustor can of said plurality of combustor cans.

2. The combustor can assembly of claim 1, wherein said first control device is operable to impart an oscillatory component having a predetermined frequency to a flow of fuel through said first combustor can fuel line and to a flow of fuel through said second combustor can fuel line.

3. The combustor can assembly of claim 2, wherein said first control device is operable to impart the oscillatory component having the predetermined frequency selected to reduce a coherence of acoustic tones of said first combustor can and the at least another combustor can of said plurality of combustor cans.

4. The combustor can assembly of claim 1, further comprising: wherein the plurality of combustor cans further comprises a third combustor can and the plurality of can fuel lines further comprises a third combustor can fuel line connecting the third combustor can to the at least one fuel manifold, and a second interconnecting fuel line coupled between said first combustor can fuel line and said third combustor can fuel line, such that said second interconnecting fuel line provides a fuel flow path between said first combustor can fuel line and said third combustor can fuel line in parallel to said fuel flow path of the at least one fuel manifold, wherein said third combustor can is not circumferentially adjacent to said first combustor can and is not circumferentially adjacent to said second combustor can, wherein said first control device is operable to impart an oscillatory component having a predetermined frequency to a flow of fuel through said third combustor can fuel line.

5. The combustor can assembly of claim 1, further comprising:
wherein the plurality of combustor cans further comprises a third combustor can and a fourth combustor can and the plurality of can fuel lines further comprises a third combustor can fuel line connecting the third combustor to the at least one fuel manifold and a fourth combustor can fuel line connecting the fourth combustor to the at least one fuel manifold, and a second interconnecting fuel line coupled between said third combustor can fuel line and said fourth combustor can fuel line such that said second interconnecting fuel line provides a fuel flow path between said third combustor can fuel line and said fourth combustor can fuel line in parallel to said fuel flow path of the at least one fuel manifold, wherein said fourth combustor can is not circumferentially adjacent to said third combustor can; and
a second control device operatively coupled to said third combustor can fuel line upstream of said second interconnecting fuel line, said second control device operable to change a dynamic operational characteristic of said third and fourth combustor cans independently of said at least another combustor can of said plurality of combustor cans.

6. The combustor can assembly of claim 5, wherein said first control device is operable to impart a first oscillatory component having a first predetermined frequency to a flow of fuel through said first combustor can fuel line and to a flow of fuel through said second combustor can fuel line, and said second control device is operable to impart a second oscillatory component having a second predetermined frequency to a flow of fuel through said third combustor can fuel line and to a flow of fuel through said fourth combustor can fuel line, wherein the second predetermined frequency differs from the first predetermined frequency.

7. The combustor can assembly of claim 1, wherein said at least one fuel manifold comprises a first fuel manifold and a second fuel manifold, said plurality of can fuel lines are a plurality of first fuel manifold can fuel lines connected to the first fuel manifold, each of said plurality of combustor cans is coupled in flow communication with said second fuel manifold via a respective one of a plurality of second fuel manifold can fuel lines so as to allow parallel flow from the second fuel manifold to the plurality of combustor cans and the plurality of second fuel manifold can fuel lines comprises a first combustor can second fuel manifold fuel line connecting the first combustor can to the second fuel manifold and a second combustor can second fuel manifold fuel line connecting the second combustor can to the second fuel manifold, said combustor can assembly further comprising:
a second interconnecting fuel line coupled between said first combustor can second fuel manifold fuel line and said second combustor can second fuel manifold fuel line such that said second interconnecting fuel line provides a fuel flow path between said first combustor can second fuel manifold fuel line and said second combustor can second fuel manifold fuel line in parallel to a fuel flow path of said second fuel manifold; and
a second control device operatively coupled to said first combustor can second fuel manifold fuel line upstream of said second interconnecting fuel line, said second control device operable to change the dynamic operational characteristic of said first and second combustor cans independently of said at least another combustor can of said plurality of combustor cans.

8. A gas turbine engine comprising:
a compressor; and
a combustor can assembly coupled in flow communication with said compressor, said combustor can assembly comprising:
a plurality of combustor cans spaced circumferentially about said gas turbine engine, wherein the plurality of combustor cans comprises at least a first combustor can and a second combustor can;
a plurality of can fuel lines, each of said plurality of can fuel lines coupled between a respective one of said plurality of combustor cans and at least one fuel manifold so as to allow parallel flow from the at least one fuel manifold to the plurality of combustor cans and the plurality of can fuel lines comprises a first combustor can fuel line connecting the first combustor can to the at least one fuel manifold and a second combustor can fuel line connecting the second combustor can to the at least one fuel manifold;
a first interconnecting fuel line coupled between the first combustor can fuel line and the second combustor can fuel line, such that said first interconnecting fuel line provides a fuel flow path between the first combustor can fuel line and the second combustor can fuel line in parallel to a fuel flow path of said at least one fuel manifold, wherein said second combustor can is not circumferentially adjacent to said first combustor can; and
a first control device operatively coupled to said first combustor can fuel line upstream of said first interconnecting fuel line, said first control device operable to change a dynamic operational characteristic of said first and second combustor cans independently of at least another combustor can of said plurality of combustor cans.

9. The gas turbine engine of claim 8, wherein said first control device is operable to impart an oscillatory component having a predetermined frequency to a flow of fuel through said first combustor can fuel line and to a flow of fuel through said second combustor can fuel line.

10. The gas turbine engine of claim 9, wherein said first control device is operable to impart the oscillatory component having the predetermined frequency selected to reduce a coherence of acoustic tones of said first combustor can and the at least another combustor can of said plurality of combustor cans.

11. The gas turbine engine of claim 8, wherein said combustor can assembly further comprises wherein the plurality of combustor cans further comprises a third combustor can and the plurality of can fuel lines further comprises a third combustor can fuel line connecting the third combustor can to the at least one fuel manifold, and a second interconnecting fuel line coupled between said first combustor can fuel line and said third combustor can fuel line, such that said second interconnecting fuel line provides a fuel flow path between said first combustor can fuel line and said third combustor can fuel line in parallel to said fuel flow path of the at least one fuel manifold, wherein said third combustor can is not circumferentially adjacent to said first combustor can and is not circumferentially adjacent to said second combustor can, wherein said first control device is operable to impart an oscillatory component having a predetermined frequency to a flow of fuel through said third combustor can fuel line.

12. The gas turbine engine of claim 8, wherein said combustor can assembly further comprises:
wherein the plurality of combustor cans further comprises a third combustor can and a fourth combustor can and the plurality of can fuel lines further comprises a third combustor can fuel line connecting the third combustor to the at least one fuel manifold and a fourth combustor can fuel line connecting the fourth combustor can to the at least one fuel manifold, and a second interconnecting fuel line coupled between said third combustor can fuel line and said fourth combustor can fuel line such that said second interconnecting fuel line provides a fuel flow path between said third combustor can fuel line and said fourth combustor can fuel line in parallel to said fuel flow path of the at least one fuel manifold, wherein said fourth combustor can is not circumferentially adjacent to said third combustor can; and
a second control device operatively coupled to said third combustor can fuel line upstream of said second third interconnecting fuel line, said second control device operable to change a dynamic operational characteristic of said third and fourth combustor cans independently of said at least another combustor can of said plurality of combustor cans.

13. The gas turbine engine of claim 12, wherein said first control device is operable to impart a first oscillatory component having a first predetermined frequency to a flow of fuel through said first combustor can fuel line and to a flow of fuel through said second combustor can fuel line, and said second control device is operable to impart a second oscillatory component having a second predetermined frequency to a flow of fuel through said third combustor can fuel line and to a flow of fuel through said fourth combustor can fuel line, wherein the second predetermined frequency differs from the first predetermined frequency.

14. The gas turbine engine of claim 8, wherein said at least one fuel manifold comprises a first fuel manifold and a second fuel manifold, said plurality of can fuel lines are a plurality of first fuel manifold can fuel lines connected to the first fuel manifold, each of said plurality of combustor cans is coupled in flow communication with said second fuel manifold via a respective one of a plurality of second fuel manifold can fuel lines so as to allow parallel flow from the second fuel manifold to the plurality of combustor cans and the plurality of second fuel manifold fuel lines comprises a first combustor can second fuel manifold fuel line connecting the first combustor can to the second fuel manifold and a second combustor can second fuel manifold fuel line connecting the second combustor can to the second fuel manifold, said combustor can assembly further comprising:
a second interconnecting fuel line coupled between said first combustor can second fuel manifold fuel line and said second combustor can second fuel manifold fuel line such that said second interconnecting fuel line provides a fuel flow path between said first combustor can second fuel manifold fuel line and said second combustor can second fuel manifold fuel line in parallel to a fuel flow path of said second fuel manifold; and
a second control device operatively coupled to said first combustor can second fuel manifold fuel line upstream of said second interconnecting fuel line, said second control device operable to change the dynamic operational characteristic of said first and second combustor cans independently of said at least another combustor can of said plurality of combustor cans.

15. A method of assembling a combustor can assembly for a gas turbine engine, said method comprising:
spacing a plurality of combustor cans circumferentially about the gas turbine engine, wherein the plurality of combustor cans comprises at least a first combustor can and a second combustor can;
coupling each of a plurality of can fuel lines between a respective one of the plurality of combustor cans and at least one fuel manifold so as to allow parallel flow from the at least one fuel manifold to the plurality of combustor cans and the plurality of can fuel lines comprises a first combustor can fuel line connecting the first combustor can to the at least one fuel manifold and a second combustor can fuel line connecting the second combustor can to the at least one fuel manifold;
coupling a first interconnecting fuel line between the first combustor can fuel line and the second combustor can fuel line such that the first interconnecting fuel line provides a fuel flow path between the first combustor can fuel line and the second combustor can fuel line in parallel to a fuel flow path of the at least one fuel manifold, wherein the second combustor can is not circumferentially adjacent to the first combustor can; and
coupling a first control device operatively to said first combustor can fuel line upstream of the first interconnecting fuel line, wherein the first control device is operable to change a dynamic operational characteristic of the first and second combustor cans independently of at least another combustor can of the plurality of combustor cans.

16. The method of claim 15, further comprising coupling the first control device such that the first control device is operable to impart an oscillatory component having a predetermined frequency to a flow of fuel through said first combustor can fuel line and to a flow of fuel through said second combustor can fuel line.

17. The method of claim 15, wherein the plurality of combustor cans further comprises a third combustor can and the plurality of can fuel lines further comprises a third combustor can fuel line connecting the third combustor can to the at least one fuel manifold, said method further comprises coupling a second interconnecting fuel line between said first combustor can fuel line and said third combustor can fuel line such that said second interconnecting fuel line provides a fuel flow path between said first combustor can fuel line and said third combustor can fuel line in parallel to said fuel flow path of the at least one fuel manifold, wherein said third combustor can is not circumferentially adjacent to said first combustor can and is not circumferentially adjacent to said second combustor can, wherein said first control device is operable to impart an oscillatory component having a predetermined frequency to a flow of fuel through said third combustor can fuel line.

18. The method of claim 15, further comprising:
wherein the plurality of combustor cans further comprises a third combustor can and a fourth combustor can and the plurality of can fuel lines further comprises a third combustor can fuel line connecting the third combustor to the at least one fuel manifold and a fourth combustor can fuel line connecting the fourth combustor to the at least one fuel manifold, and coupling of a second interconnecting fuel line between said third combustor can fuel line and said fourth combustor can fuel line such that the second interconnecting fuel line provides a fuel flow path between said third combustor can fuel line and said fourth combustor can fuel line in parallel to the fuel flow path of the at least one fuel manifold, wherein the fourth combustor can is not circumferentially adjacent to the third combustor can; and coupling a second control device operatively to said third combustor can fuel line upstream of the second interconnecting fuel line, wherein the second control device is operable to change a dynamic operational characteristic of the third and fourth combustor cans independently of said at least another combustor can of the plurality of combustor cans.

19. The method of claim 18, further comprising:

coupling the first control device such that the first control device is operable to impart a first oscillatory component having a first predetermined frequency to a flow of fuel through said first combustor can fuel line and to a flow of fuel through said second combustor can fuel line; and coupling the second control device such that the second control device is operable to impart a second oscillatory component having a second predetermined frequency to a flow of fuel through said third combustor can fuel line and to a flow of fuel through said fourth combustor can fuel line, wherein the second predetermined frequency differs from the first predetermined frequency.

20. The method of claim 15, wherein the at least one fuel manifold comprises a first fuel manifold and a second fuel manifold, the plurality of can fuel lines are a plurality of first fuel manifold can fuel lines connected to the first fuel manifold, each of the plurality of combustor cans is coupled in flow communication to the second fuel manifold via a respective one of a plurality of second fuel manifold can fuel lines so as to allow parallel flow from the second fuel manifold to the plurality of combustor cans and the plurality of second fuel manifold fuel lines comprises a first combustor can second fuel manifold fuel line connecting the first combustor can to the second fuel manifold and a second combustor can second fuel manifold fuel line connecting the second combustor can to the second fuel manifold, the method further comprising:

coupling a second interconnecting fuel line between said first combustor can second fuel manifold fuel line and said second combustor can second fuel manifold fuel line such that the second interconnecting fuel line provides a fuel flow path between said first combustor can second fuel manifold fuel line and said second combustor can second fuel manifold fuel line in parallel to a fuel flow path of the second fuel manifold; and coupling a second control device operatively to said first combustor can second fuel manifold fuel line upstream of the second interconnecting fuel line, wherein the second control device is operable to change the dynamic operational characteristic of the first and second combustor cans independently of the at least another combustor can of the plurality of combustor cans.

* * * * *

UNITED STATES PATENT AND TRADEMARK OFFICE
CERTIFICATE OF CORRECTION

PATENT NO.        : 9,897,322 B2
APPLICATION NO.   : 14/793000
DATED             : February 20, 2018
INVENTOR(S)       : Kihyung Kim et al.

It is certified that error appears in the above-identified patent and that said Letters Patent is hereby corrected as shown below:

In the Claims

Claim 12, Column 13, Lines 26-27, delete "said second third interconnecting" and insert therefor -- said second interconnecting --.

Signed and Sealed this
Nineteenth Day of February, 2019

Andrei Iancu
*Director of the United States Patent and Trademark Office*